United States Patent

Kupper et al.

(10) Patent No.: US 7,510,506 B2
(45) Date of Patent: Mar. 31, 2009

(54) METHOD AND DEVICE FOR CONTROLLING GEAR RATIO CHANGE IN A TRANSMISSION CONTAINED IN THE DRIVE TRAIN OF A MOTOR VEHICLE WITH GEARS THAT CAN BE SHIFTED UNDER POWER

(75) Inventors: Klaus Kupper, Buhl (DE); Georg Schneider, Karlsruhe (DE)

(73) Assignee: Luk Lamellen und Kupplungabau Beteiligungs KG, Buhl (DE)

( * ) Notice: Subject to any disclaimer, the term of this patent is extended or adjusted under 35 U.S.C. 154(b) by 0 days.

(21) Appl. No.: 11/357,634

(22) Filed: Feb. 17, 2006

(65) Prior Publication Data

US 2006/0142118 A1 Jun. 29, 2006

Related U.S. Application Data

(62) Division of application No. 10/776,454, filed on Feb. 10, 2004, now Pat. No. 7,056,264.

(51) Int. Cl.
*B60K 41/02* (2006.01)
*F16H 3/38* (2006.01)

(52) U.S. Cl. ............ 477/180; 477/181; 74/340

(58) Field of Classification Search ............ 74/340, 74/335, 331; 477/143, 180, 181, 174, 175, 477/107; 701/51; 192/3.54, 3.61
See application file for complete search history.

(56) References Cited

U.S. PATENT DOCUMENTS

| | | | |
|---|---|---|---|
| 5,002,170 A * | 3/1991 | Parsons et al. .......... 477/86 |
| 5,890,392 A | 4/1999 | Ludanek et al. | |
| 5,915,512 A * | 6/1999 | Adamis et al. ........... 192/3.61 |
| 5,950,781 A | 9/1999 | Adamis et al. | |
| 6,014,603 A | 1/2000 | Le Van et al. | |
| 6,065,360 A | 5/2000 | Hollingsworth et al. | |
| 6,460,425 B1 | 10/2002 | Bowen | |
| 6,588,292 B2 | 7/2003 | Yamasaki et al. | |
| 6,634,247 B2 | 10/2003 | Pels et al. | |
| 6,698,304 B2 * | 3/2004 | Gierling et al. ........... 74/340 |
| 6,755,089 B2 * | 6/2004 | Hirt ........................ 74/329 |
| 6,832,978 B2 * | 12/2004 | Buchanan et al. ........ 477/174 |
| 6,881,171 B2 * | 4/2005 | Kuhstrebe et al. ........ 477/78 |
| 6,887,184 B2 * | 5/2005 | Buchanan et al. ........ 477/174 |
| 6,909,955 B2 * | 6/2005 | Vukovich et al. ......... 701/51 |
| 2004/0025612 A1 * | 2/2004 | Ahnert et al. ............ 74/329 |

FOREIGN PATENT DOCUMENTS

JP 10089456 4/1998

* cited by examiner

*Primary Examiner*—Roger Pang
(74) *Attorney, Agent, or Firm*—Darby & Darby P.C.

(57) ABSTRACT

In a parallel manual transmission, an upshifting under power is executed based upon preset operating conditions, for example with a fully depressed accelerator pedal, without an electronically controlled, load-reducing ignition retard. When shifting to a higher gear, the engine output is used for increasing the speed of the engine and for the propulsion of the vehicle, based upon the operating condition of the drive train.

5 Claims, 2 Drawing Sheets

METHOD AND DEVICE FOR CONTROLLING GEAR RATIO CHANGE IN A TRANSMISSION CONTAINED IN THE DRIVE TRAIN OF A MOTOR VEHICLE WITH GEARS THAT CAN BE SHIFTED UNDER POWER

CROSS-REFERENCE TO RELATED APPLICATION

This is a divisional of copending application Ser. No. 10/776,454, filed Feb. 10, 2004, which claims the benefit of German Patent Application No. 103 05 515.0 filed on Feb. 11, 2003. The aforementioned prior applications are hereby incorporated herein by reference in their entirety.

TECHNICAL FIELD

The invention relates to a method and a device for controlling gear ratio change in a transmission that is contained in the drive train of a motor vehicle, with gears that can be shifted under power. More precisely, the invention relates to a method and device for upshifting an automatically shifted parallel manual transmission that is contained in the drive train of a motor vehicle. The invention further relates to a method and device for increasing the gear ratio of a transmission that is contained in the drive train of a motor vehicle, with gears that can be automatically shifted without interruptions in propulsive power.

BACKGROUND

Automatic drive trains including automatic transmissions that are shifted under power and that are operated by means of actuators based on preset programs are increasingly being used in automobiles. Transmissions of this type not only increase driving comfort but they also enable substantial fuel consumption savings as the amount of driving done at lower engine speeds is increased.

FIG. 1 shows a section of a drive train of a vehicle that is equipped with such a transmission. A twin-clutch transmission, indicated as a unit by the number 10 and also called a parallel manual transmission, has two input shafts 12 and 14, each of which can be connected via a clutch 16 and 18, respectively, to the crankshaft 20 of an internal combustion engine. Gear wheels are arranged on the input shafts 12 and 14 and can be meshed with gear wheels that are arranged on an output shaft 22 such that the gear wheels can shift but not rotate, in order to allow shifting to different gears. The output shaft 22 is connected, for example, to a rear differential of the vehicle.

One actuator 24 or 26 is allocated to each clutch 16 or 18, respectively, to implement its actuation.

The actuator 26 is illustrated here in detail by way of example and includes an electric motor 30. The output pinion gear 32 of the electric motor 30 is equipped with internal threading that meshes with a threaded tree rod 34, which is at the same time the rod for a piston 36, which operates in a hydraulic cylinder 38. The hydraulic cylinder 38 is connected via a hydraulic transmission link 40 to an actuating mechanism, for example a release lever, of the clutch 18. To ascertain the position of the piston 36 or the release lever of the clutch 18, a sensor 42, such as an increment counter, is used to determine the angle of rotation of the output pinion gear 32. Because of the threaded engagement between the pinion gear 32 and the threaded tree rod 34, the linear shifting of the threaded tree rod 34 can be ascertained from changes in the angle of rotation. In order to have a point of reference that is referred to in the shifting of the piston 36, a detector bore provided in the hydraulic cylinder 38 can be passed over in a known manner, while pressure builds up in the hydraulic transmission link 40, by an increase in torque or in the energy input of the electric motor 30. As additional reference points, centers of pressure or mechanical stops for the clutch can be approached.

The gear wheels arranged on the output shaft 22 of the twin clutch transmission 10 are moved by means of selector forks 46, which operate in conjunction with selector fingers 48, which are arranged on a shifting shaft 50. For example, a shifting shaft 50 having a number of selector fingers 48 may be provided, which actuates all the gear wheels arranged on the output shaft 22, or, for example, two shifting shafts 50 may be provided, which actuate the selector forks of those gear wheels that are allocated to one of the input shafts 12 or 14. For each shifting shaft 50, two actuators are provided, one that rotates the shifting shaft 50 back and forth around its axle to engage gears, and another that shifts the shifting shaft 50 in accordance with the drawing, perpendicular to the plane of the paper, to choose between various shifting tracks.

The actuators that are allocated to a shifting shaft 50 (also indicated by "i") are indicated in the figure by the numbers 52 and 54. The position sensing can be executed as described above in reference to the electric motor 30. In order to determine the absolute position of the shifting shaft 50 or the selector finger 48, reference points are approached, for example mechanical stops in a selector track or shifting track, or mechanical stops approached by the selector forks 46 themselves.

To control the above-mentioned actuators (24, 26, 52, 54), a control unit or control device 60 is provided, which includes a microprocessor 62 with a program memory 64 and a data memory 66.

Inputs 68 to the control unit 60 are connected to various task-based sensors or position indicators, such as a wheel speed sensor 70 for determining the speed of a wheel, a sensor 72 for determining the position of an accelerator pedal 73, a position indicator 74 for determining the position of the selector lever of a transmission actuating device 76, an output 77 of the transmission actuating device 76, through which the actuation of various control programs, for example a comfort driving or performance driving program, is transmitted, a speed sensor 78 for determining the speed of the internal combustion engine, etc. It is understood that the control unit 60 may also be designed such that it can itself recognize driving conditions and/or driver profiles and can activate corresponding programs, such as a mountain driving program or a performance driving program.

Outputs 79 from the control unit 60 are connected to the actuators, which can be actuated by another actuator, and to a powershift element 80 of the internal combustion engine.

The design and the function of the above-described arrangement, which can be altered in a multitude of ways, are known in the art and thus will not be described in greater detail.

One problem with this type of automatically actuated parallel manual transmission, or with automated manual transmissions in general, lies in the fact that under certain conditions with an acceleration reference, it is not possible to achieve the rates that can be achieved with a manually operated manual transmission.

This is due generally to the fact that with a manually shifted transmission, during acceleration measurement the vehicle operates outside of a permissible range for individual components, for example with extremely high shifting forces, a "smoking" clutch, etc. With automated manual transmissions, this is not possible since otherwise the danger would exist that frequent repetitions of such acceleration attempts could destroy components of the drive train.

With automated manual transmissions that are shifted with an interruption in propulsive power, during the shifting process the engine speed is limited by means of ignition retard, or directly in the powershift element, as otherwise the engine would race uncontrollably during the shifting process.

In a vehicle having a parallel manual transmission or twin clutch transmission there is no need for slow gear shifts or a load-reducing ignition retard in order to avoid a racing of the engine during the shifting process, because the next gear in the shifting process can be selected ahead of time by engaging a gear wheel of the input shaft that is being operated with an open clutch, with a gear wheel of the output shaft, and by effectively engaging the gear wheel by simply switching the clutches 16, 18. Nevertheless, with upshifts following the end of the overlapping phase of the two clutches 16, and 18, a load-reducing ignition retard is executed in order to lower the engine speed without superelevating the output torque to the target speed. As a result of this load-reducing ignition retard, the available propulsive power is not fully utilized, causing acceleration time to be wasted.

One property of automatic transmissions consists in the fact that these transmissions, if necessary, automatically downshift to a lower gear or transition to a higher gear if the propulsive power is no longer sufficient to fulfill the wishes of the driver. One characteristic feature of powershift transmissions, especially parallel manual transmissions, but also of conventional automatic transmissions that operate with planetary gear sets, or CVT [continuously variable transmission] transmissions (transmissions with continuously variable gears), is that during the transition to a higher gear the engine power is used both to increase the engine speed and to propel the vehicle, which can have a negative effect on driving comfort.

SUMMARY

The object of the invention is to provide a solution to the problems discussed above.

A first solution to the object of the invention is attained with a method for upshifting an automatically shifted parallel manual transmission that is contained in the drive train of a motor vehicle and that has two parallel drive trains, each with its own clutch. Each drive arm can be activated by engaging the clutch that is allocated to it, so that in the drive arm that is not activated a new gear can be engaged. The new gear can be activated by disengaging the one clutch and engaging the other clutch, while an upshifting of the parallel manual transmission is effected based upon preset operating conditions, without an electronically controlled load-reducing ignition retard.

In accordance with a further refinement of the process specified in the invention a preset operating condition is transmitted by means of a fully depressed accelerator pedal.

In accordance with a further implementation of the process specified in the invention, a preset operating condition is transmitted by means of an additionally actuated shift program.

Furthermore, a preset operating condition can be provided in that the vehicle, in the depression of the accelerator pedal beyond a predetermined degree, is held at rest by an actuation of the brakes.

For the shortest possible acceleration rates, the process is advantageously implemented such that the disengagement of the one clutch and the engagement of the other clutch are controlled such that during at least part of the shifting process the engine runs at a speed that corresponds to its highest power level.

A further solution to the object of the invention is attained with a process for increasing the gear ratio of a transmission that is contained in the drive train of a motor vehicle and that can be automatically shifted without interruption of its gear ratio propulsive power, especially a parallel manual transmission, in which process, with an increase under power of the gear ratio of the transmission, the division of the engine power into one portion that is available for increasing the speed of the engine and one portion that is available for the propulsion of the vehicle, depending upon the operating conditions of the drive train, is changed.

Advantageously, the portion of the engine power that is available for increasing engine speed is expanded with an increasingly rapid actuation of the accelerator pedal.

In the case of a gear ratio increase without a change in the position of the accelerator pedal, the engine output is advantageously used largely for the propulsion of the vehicle.

In a further process for controlling a parallel manual transmission as specified in the invention, with transmissions that are in deceleration, before they drop below a minimum vehicle speed, and before the activated driving gear is disengaged, a starting gear is engaged.

Another solution to the object of the invention is attained with a device for controlling the gear ratio change of a transmission contained in the drive train of a motor vehicle and having gears that can be shifted under power, which includes a transmission, actuators for changing the gear ratio of the transmission, and a control unit that is connected to sensors contained in the drive train of the motor vehicle, and that includes a microprocessor and access memory units, which control device controls the actuators for implementing at least one of the above-named processes.

Below, the invention will be described by way of example, with reference to schematic drawings, and with additional details.

BRIEF DESCRIPTION OF THE DRAWINGS

The foregoing and other features of the present invention will be more readily apparent from the following detailed description and drawings of the illustrative embodiments of the invention wherein like reference numbers refer to similar elements and in which.

DETAILED DESCRIPTION OF THE PREFERRED EMBODIMENTS

Figure 1:
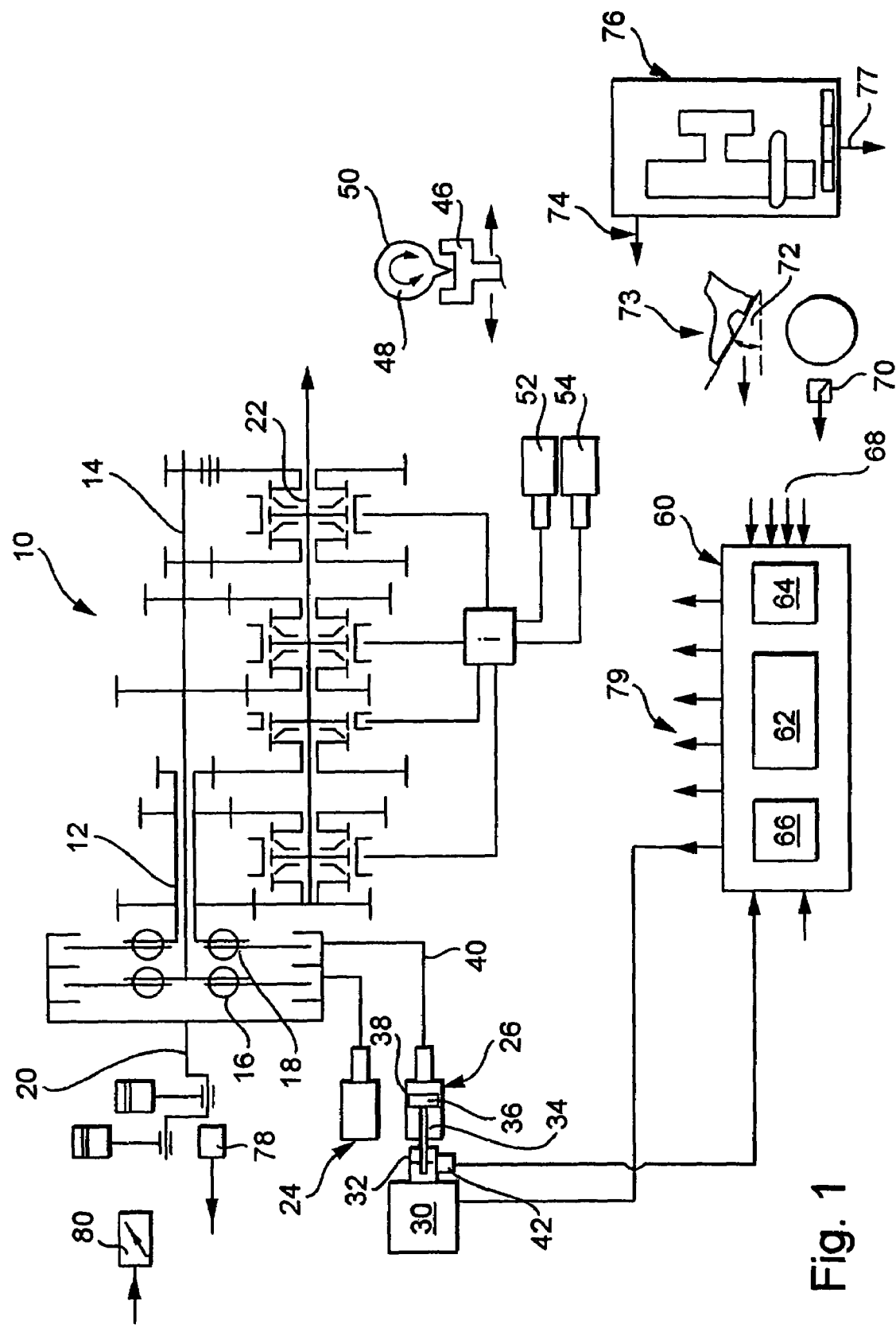
FIG. 1 is a block diagram of sections of a conventional drive train of a vehicle.
Figure 2:
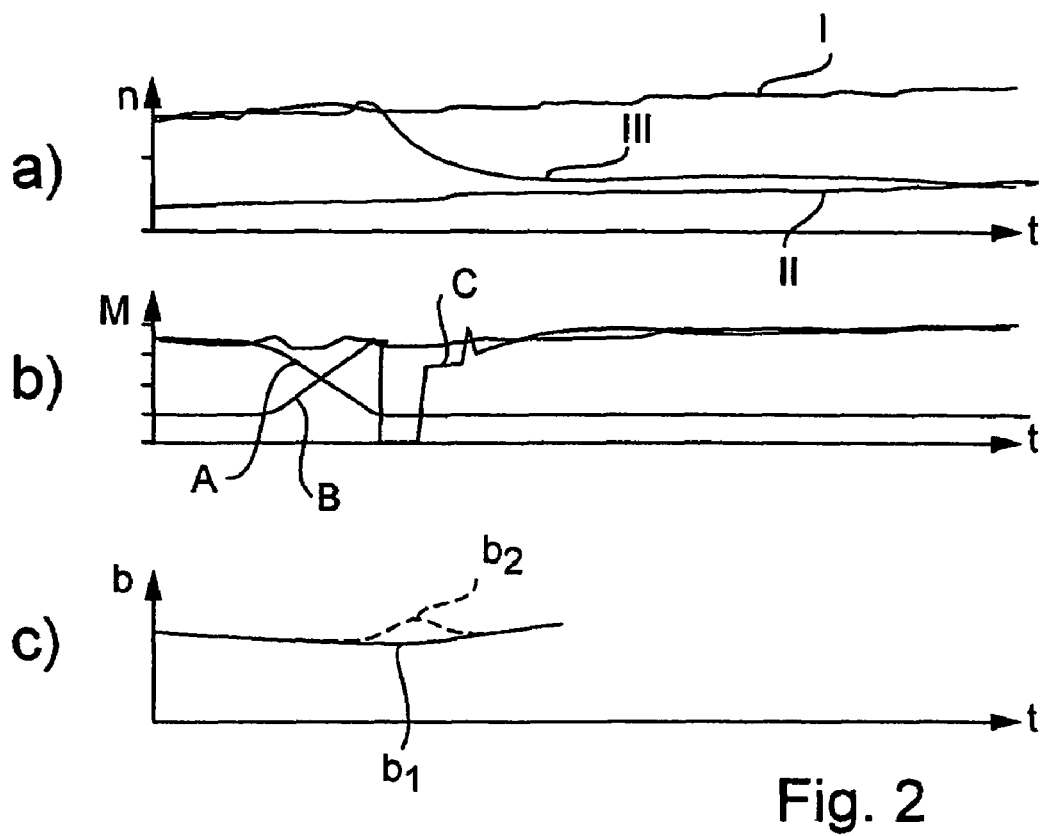
FIGS. 2a-2c are diagrams showing an upshifting of the transmission in FIG. 1.

On the basis of FIG. 2, a conventional upshifting of the transmission 10 of FIG. 1 will first be described.

In FIG. 2a, speeds n are illustrated over time t. The curve I indicates the speed of the transmission input shaft 12 or 14 that is activated first in a lower gear. It is assumed that this is the input shaft 12 with a closed clutch 18, wherein the vehicle is driving in second gear. The curve II indicates the speed of the input shaft 14 when the third gear has been engaged, which is correspondingly lower than the speed of the input shaft 12. With a shifting from second gear to third gear, the clutch 18 that is first closed is opened, and the clutch 16 that is first opened is closed, so that the speed of the crankshaft 20 of the engine (curve III) moves away from the curve I and approaches the curve II.

In FIG. 2b, the curve A represents the first closed and then open clutch 18, the curve B represents the first open and then closed clutch 16, and the curve C represents the engine torque M, in the same temporal representation as the curves I through III and A, B. As is apparent, the engine torque (curve C) is taken back by means of a retarding of the ignition or the powershift element 80 (FIG. 1) during the drop in engine speed (curve III), so that the "inertial force" that is produced by the reduction in engine speed does not translate to uncomfortable, supplementary propulsion. Overall, an acceleration course in accordance with the continuous curve $b_1$ shown in FIG. 2c is achieved. Due to the high "inertial force" of the engine, in order to produce the most comfortable shifting that is possible it may be necessary to drop the engine torque M to a value below zero for a short time, wherein a portion of the inertial force or rotational energy of the engine that is released during the drop in speed is used to drive the engine, while the remaining portion goes to accelerating the vehicle.

For a configuration that will optimize performance, it is advantageous to eliminate the engine or torque engagement in accordance with the curve C during upshifting. The kinetic energy that is released by the drop in engine speed is then converted to additional acceleration, as indicated by the dashed curve $b_2$ in FIG. 2c. It is understood that, due to the speeds of the input shafts 12 and 14 of the transmission that are preset above the gear ratios, not all of the rotational energy made available by the drop in engine speed can be converted to propulsive power, rather, a portion is converted as heat in the closing clutch. As a result of the high load on the closing clutch and the clearly noticeable excessive increase in acceleration, it is expedient to eliminate a load-reducing ignition retard only in certain situations in which maximum acceleration is required, and thus momentary excessive increases are acceptable or desirable.

Examples of such situations are described as follows. Performance-oriented situations, such as driving with a fully depressed accelerator pedal (kickdown). A kickdown operation can be coupled with additional conditions, in order for the control device 60 to implement an upshifting without a load-reducing ignition retard. Such additional conditions may include:

1. Driving starting from a stationary position with a fully depressed accelerator pedal (detected for example by the wheel speed sensor 70 (or a sensor designed for ascertaining the speed of the output shaft 22 of the transmission), wherein the suppression of a load-reducing ignition retard may occur, for example, only during a preset time interval after driving has started, and/or 2. Kickdown starting with a stalled vehicle, as is customary with acceleration measurements, and/or 3. Activation of an extremely performance-oriented mode (by means of control elements that are provided on the actuating device 76 or in the control panel).

When one of these intake conditions, listed by way of example, is recognized by the control unit 60 as being fulfilled, the load-reducing ignition retard is not activated during upshifting as long as the driving situation or the current operating condition of the drive train is detected as present. As soon as this is no longer the case, for example the accelerator pedal is no longer in its maximum position, the time interval has expired, and/or the program is no longer selected, then the system transitions to the normal shifting process control, in which a load-reducing ignition retard is required during upshifting for reasons of comfort and lifespan extension.

The described suppression of a load-reducing ignition retard during upshifting with clear reductions in engine speed can be used in all types of transmissions that are shifted to lower gears under power, for example conventional automatic transmissions having planetary gear sets controlled via clutches, CVT transmissions (such as pulley belt transmissions), etc. For the greatest possible acceleration it can be expedient to control the clutches during the shifting process such that the engine (when the accelerator pedal is fully depressed) races at the highest output speed, and then is slowed by the drag of the clutch to the new speed.

Figure 3:
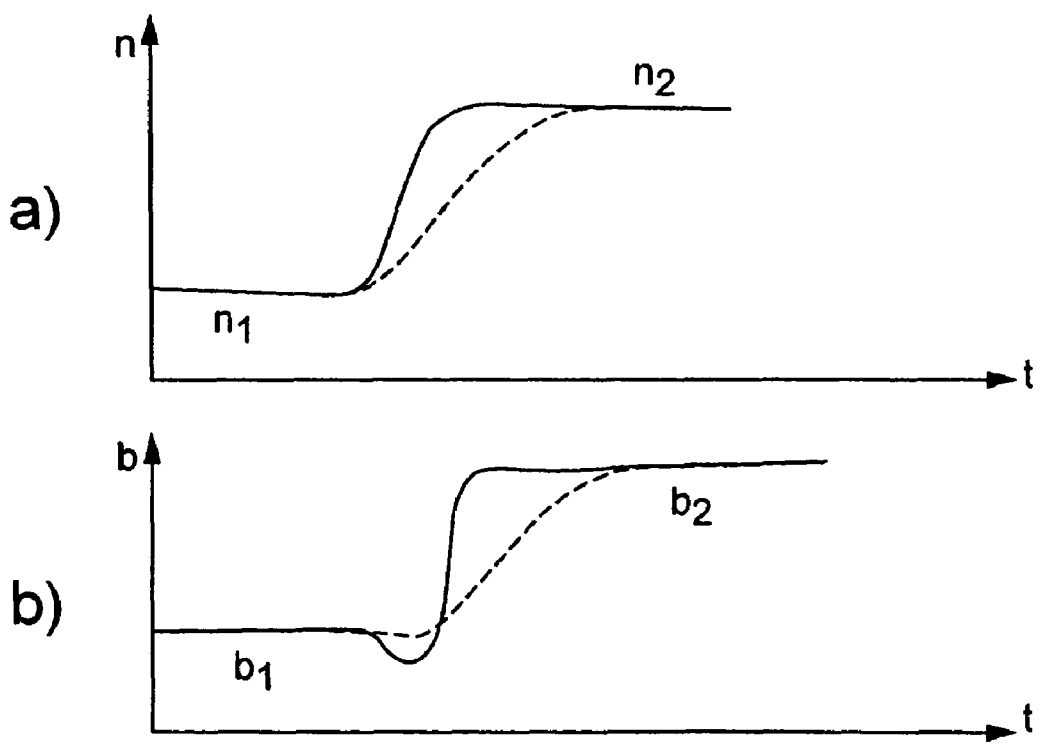
FIGS. 3a-3b are diagrams showing a downshifting of the transmission in FIG. 1.

On the basis of FIG. 3, the downshifting of the transmission 10 of FIG. 1 will be described in detail below. The curves of FIG. 3a show the engine speed n as a function of time, the curves in FIG. 3b show the acceleration b as a function of time.

It is assumed that the vehicle is driving in a higher gear at the speed $n_1$, which, for example, does not increase even if the driver gives it more gas, so that the control unit 60 controls the shifting of the transmission to a lower gear, wherein the speed $n_1$ transitions to a higher speed $n_2$. The continuous curve shows a relatively rapid increase in the engine speed n from $n_1$ to $n_2$. For this rapid increase in speed, a greater share of engine output, more or less depending upon the given position of the accelerator pedal, is required, which then is not available for the propulsion of the vehicle, so that the acceleration b first drops down, and then, once the engine is at its higher speed, assumes the constant greater value $b_2$. Due to the drop in acceleration, the described downshifting process is relatively uncomfortable, however it then leads to a rapid increase in acceleration.

The downshifting process becomes more comfortable when the speed $n_1$ increases at a lower gradient to the speed $n_2$. A larger amount of engine output relative to the above-described case is then available for the acceleration of the vehicle, so that the acceleration $b_1$ drops less, and more or less consistently approaches the higher value $b_2$.

According to the invention, the downshifting process is controlled by the control unit 60, based upon the operating parameters of the drive train, such that the output that is available during the increase in engine speed is appropriately applied to increasing the speed of the engine itself and the acceleration or propulsive power of the vehicle.

For example, with a more rapid actuation of the accelerator pedal or a high pedal gradient, it is expedient to utilize a larger share of engine output for increasing the speed of the engine itself, in order that the higher speed and thus the higher engine output can be realized as rapidly as possible, even if this is associated with a loss in comfort as a result of the brief reduction in propulsive power. The division of engine output into power for accelerating the engine itself and power for accelerating the vehicle is accomplished by means of a coordinated actuation of the clutches 16 and 18 (FIG. 1), wherein especially a rapid engagement of the clutch to be engaged leads to a speed course that corresponds to the continuous curve, and a slow engagement leads to a speed course that corresponds to the dashed curve.

It is understood that the various types of paired clutch actuations, together with a control of the powershift element 80 by the control unit, are possible, including, for example, a type of control in which a rapid depression of the gas pedal also causes the powershift element 80 to be opened during downshifting, in order to make additional accelerative power available to the engine itself. This can also definitely result in an excessive increase in the speed beyond $n_2$, which then leads to an acceleration that lies briefly above the acceleration $b_2$.

If, due to a change in external conditions, for example greater driving resistance due to an uphill grade or a strong crosswind, a lower gear is called for via a change to a different characteristic map while the accelerator remains in a constant position, the driver expects a smooth shifting process, so that only a small share of output is utilized for the acceleration of the engine, i.e. the closing clutch closes with an appropriate amount of drag.

The distribution of power during shifting can be changed not only in stages, for example based upon a selected driving program (mountain driving program, performance driving program, etc.), but also continuously. This makes sense especially when the actual shifting guidelines are continuously being shifted, for example based upon a detected uphill grade of the road, a strong crosswind, the weight of the vehicle, or a level of performance based upon the driver's behavior. These and other variables, alone or in combination, can determine the distribution of output by means of suitable links.

If a continuous input variable for the variation of the power distribution is used, then the power distribution can be continuously or non-continuously varied, based upon any function.

The described varied distribution of engine output to the accelerative power for increasing engine speed and for the acceleration of the vehicle can be utilized in powershift transmissions of the widest variety of constructions, such as parallel manual transmissions, conventional automatic transmissions with planetary gears, or transmissions with continuously variable gear ratios.

One problem that occurs from time to time with parallel manual transmissions consists in the fact that when the vehicle is stopped, or shortly before the vehicle is stopped, jolts that negatively affect driving comfort are detectable at lower speeds. Such jolts can be prevented by preselecting or engaging the first or starting gear in the parallel manual transmission being decelerated, i.e. when the engine is being driven by the vehicle, below a specific minimum speed, before the clutch of the engaged driving gear, in general the second gear, opens. The preset speed can be selected, for example, such that it is the speed at which the vehicle accelerates better in first gear than in second gear. With the timely preselection or shifting of the first gear, the engagement of the first gear that takes place with a synchronization, cannot have a disruptive effect on the still coupled shaft of the second gear.

The following patent claims are proposed formulations, without prejudice to obtaining further patent protection. The applicant reserves the right to claim additional combinations of characterizing features that have been disclosed only in the description and/or the drawings. References used in the sub-claims refer to the further development of the object of the main claim through the characterizing features of that sub-claim; they are not to be understood as a waiver to obtaining independent protection for the combination of characterizing features contained in the sub-claims. Because the objects of the sub-claims can represent objective and independent inventions on the priority date with respect to the state of the art, the applicant reserves the right to make them the object of independent claims or declarations of division. They may also contain independent inventions, the form of which is independent from the objects of the preceding sub-claims.

The exemplary embodiments are not to be understood as a restriction of the invention. Rather, within the scope of the present disclosure, numerous changes and modifications are possible, especially such variants, elements, and combinations that, for example, can be arrived at by an expert in the field by modifying individual features or elements or process steps described in connection with those of the general description and embodiments, and the claims, and contained in the drawings, with respect to the attainment of the object or the achievement of advantages, and that lead to a new object or to new process steps or process sequences as a result of combinable characterizing features.

What we claim is:

1. A method for downshifting of an automatically-shifted parallel manual transmission in a vehicle by one gear step, gears of the transmission are changed without interruption in propulsive power, and which is contained in a drive train of a motor vehicle, the method comprising the step of:

changing the division of engine output into one portion that is available for increasing the speed of the engine and another portion that is available for the propulsion of the vehicle with an increase in the gear ratio of the transmission under power as a result of downshifting by one gear step, based upon the operating conditions of the drive train, whereby the division of engine output into power for propulsion of the vehicle is accomplished by means of a coordinated actuation of dual clutches of the automatically-shifted manual transmission.

2. The method pursuant to claim 1, further comprising the step of expanding the portion of the engine output that is available for increasing the speed of the engine with an increasingly rapid actuation of an accelerator pedal.

3. The method pursuant to claim 2, further comprising the step of using the engine output for the propulsion of the vehicle with an increase in gear ratio without a change in the position of the accelerator pedal.

4. The method for controlling an automatically-shifted parallel manual transmission in a vehicle according to the method of claim 1, the method further comprising the steps of:

engaging a starting gear when the transmission is decelerating, before the vehicle drops below a minimum speed and before a disengagement of an activated driving gear and during an upshifting process, and dividing an engine's increased torque into two parts, one governing propulsion of the vehicle, the other being used to accelerate the engine's crankshaft, whereby the division of the engine's increased torque into power for propulsion of the vehicle is accomplished by means of a coordinated actuation of dual clutches that are part of the automatically-shifted parallel manual transmission.

5. The method according to claim 1, wherein the coordinated actuation of the dual clutches of the automatically-shifted manual transmission is accomplished in one gear step.

* * * * *

UNITED STATES PATENT AND TRADEMARK OFFICE
CERTIFICATE OF CORRECTION

| | | |
|---|---|---|
| PATENT NO. | : 7,510,506 B2 | Page 1 of 1 |
| APPLICATION NO. | : 11/357634 | |
| DATED | : March 31, 2009 | |
| INVENTOR(S) | : Klaus Kupper et al. | |

It is certified that error appears in the above-identified patent and that said Letters Patent is hereby corrected as shown below:

Title page item [73] In the Assignee, please delete "LuK Lamellen und Kupplungabau Beteiligungs KG" and insert -- LuK Lamellen und Kupplungsbau Beteiligungs KG --, therefor.

In the Title of the patent, under Foreign Application Priority Data, please insert -- DE 103 05 515, Feb. 11, 2003 --.

Signed and Sealed this

Twenty-second Day of June, 2010

David J. Kappos
*Director of the United States Patent and Trademark Office*